United States Patent
Li et al.

(10) Patent No.: US 8,948,285 B2
(45) Date of Patent: Feb. 3, 2015

(54) TENTPOLES SCHEME TO ACHIEVE RELIABLE V2V COMMUNICATIONS

(71) Applicants: GM Global Technology Operations LLC, Detroit, MI (US); Carnegie Mellon University, Pittsburgh, PA (US)

(72) Inventors: Zheng Li, Pittsburgh, PA (US); Fan Bai, Ann Arbor, MI (US); Vijayakumar Bhagavatula, Pittsburgh, PA (US)

(73) Assignees: GM Global Technology Operations LLC, Detroit, MI (US); Carnegie Mellon University, Pittsburgh, PA (US)

( * ) Notice: Subject to any disclaimer, the term of this patent is extended or adjusted under 35 U.S.C. 154(b) by 0 days.

(21) Appl. No.: 13/779,688

(22) Filed: Feb. 27, 2013

(65) Prior Publication Data

US 2014/0241444 A1      Aug. 28, 2014

(51) Int. Cl.
*H04K 1/10*     (2006.01)
*H04L 1/00*     (2006.01)

(52) U.S. Cl.
CPC .................................. *H04L 1/0026* (2013.01)
USPC ........... 375/260; 375/219; 375/295; 375/316; 375/340

(58) Field of Classification Search
CPC .................................................... H04L 1/0026
USPC .......................... 375/219, 260, 340, 295, 316
See application file for complete search history.

(56) References Cited

U.S. PATENT DOCUMENTS

2011/0096816 A1*   4/2011   Siti et al. ........................ 375/219
2011/0280325 A1   11/2011   Fernandez
2013/0215942 A1*   8/2013   Addepalli et al. ............ 375/224

OTHER PUBLICATIONS

Szczypiorski, Krzysztof, "Hiding Data in OFDM Symbols of IEEE 802.11 Networks" Universtiy of Technology, Institute of Telecommunications, Warsaw, Poland, pp. 1-6.

Li, Zheng, et al. "Method and Apparatus of Triple-Decoding for IEEE 802.11p Physical Layer Mechanism" U.S. Appl. No. 13/585,656, filed Aug. 14, 2012.

* cited by examiner

*Primary Examiner* — Leon Flores
(74) *Attorney, Agent, or Firm* — John A. Miller; Miller IP Group, PLC

(57) ABSTRACT

A communications system including a transmitter and a receiver. The transmitter transmits a signal with normal data symbols and at least one dual-use data symbol, where the dual-use data symbol has user data and more data protection than the normal data symbols. The receiver receives the transmitted signal and decodes the dual-use data symbol and uses information from decoding of the dual-use data symbol to improve a channel estimate for the normal data symbols.

18 Claims, 6 Drawing Sheets

TENTPOLES SCHEME TO ACHIEVE RELIABLE V2V COMMUNICATIONS

BACKGROUND OF THE INVENTION

1. Field of the Invention

This invention relates generally to a broadcast communications system, and, more particularly, to a vehicular broadcast communications system that transmits user data with extra protection to improve a channel estimate used to decode the user data with normal protection.

2. Discussion of the Related Art

As the automobile has become more technologically advanced, need has arisen for a reliable vehicular communications network composed of vehicle-to-vehicle (V2V) and vehicle-to-infrastructure (V2I) communication. Applications for a vehicular communications network range from safety to multimedia. By forming vehicular networks, vehicles can share traffic flow information, alert vehicles of hazardous road conditions ahead, and help drivers be more aware of neighboring vehicles. In addition, a reliable vehicular communications network helps enable autonomous vehicles.

The IEEE 802.11p standard, "the standard," is the core technology for vehicular networks. This standard has a physical layer, which utilizes Orthogonal Frequency Division Multiplexing (OFDM), where OFDM is a spectrally efficient multi-carrier modulation scheme. The subcarriers within an OFDM signal are orthogonal to each other in both the time and frequency domains, and as such the subcarriers do not interfere with each other. For a given data rate, an OFDM symbol is longer than a symbol from a conventional communications scheme. This helps protect OFDM from multipath effects. In addition to this OFDM employs a cyclic prefix at the beginning of each symbol, which is a copied version of the tail section of the same symbol. This cyclic prefix (also called a guard interval) maintains subcarrier orthogonality and prevents inter-symbol interference.

The 802.11p PHY is similar to the 802.11a PHY with two primary differences, namely, the 802.11p standard uses a 10 MHz bandwidth, where the 802.11a standard uses a 20 MHz bandwidth, and the 802.11p standard uses an operating frequency of 5.9 GHz, where the 802.11a standard uses an operating frequency of 5 GHz. When using a binary phase-shift keying (BPSK) modulation scheme with ½ coding rate, this yields a data rate of 3 Mb/s.

The V2V environment is outdoor and highly dynamic. Thus, the channel characteristics of V2V channels are fundamentally different from those of indoor stationary channels. By directly adopting a standard 802.11p transceiver the communications system may be unreliable. Therefore, understanding the V2V channels to develop wireless transceivers that are particularly suited for V2V channels is a prerequisite to realizing reliable V2V communications that will enable the envisioned applications.

Initial research focused on studying the behavior of the mobile V2V channel. This research measured the statistical characteristics of the V2V channel, and studied the feasibility of using different time scaled OFDM waveforms. The efforts identified that the primary detriment to performance of the 802.11p standard is the channel's short coherence time. Because, the 802.11p standard does not restrict the length of data packets, the short coherence time is a major concern. Short packets will naturally have better performance, whereas longer packets will suffer from the short coherence time of the channel.

Previous research focused on designing receiver technologies within the 802.11p standard. Those efforts produced several equalization schemes for OFDM including Spectral Temporal Averaging (STA) and the Triple Decoding scheme. However, the best achievable packet error rate, PER, was still only about 15%, which fails to provide reliable V2V communications, which comes with a PER of 10% or less.

What is needed is a better transceiver that can achieve a very low PER to provide a reliable vehicular communications network.

SUMMARY OF THE INVENTION

In accordance with the teachings of the present invention, a vehicular communications system is disclosed that includes a transmitter and a receiver. The transmitter transmits a signal with normal data symbols and at least one dual-use data symbol, where the dual-use data symbol includes user data and more data protection than the normal data symbol. The receiver receives the signal, decodes the dual-use data symbol and uses information from decoding of the dual-use data symbol to improve a channel estimate for the normal data symbols.

Additional features of the present invention will become apparent from the following description and appended claims, taken in conjunction with the accompanying drawings.

BRIEF DESCRIPTION OF THE DRAWINGS

FIG. 5 is another OFDN symbol using a Tentpoles Scheme implementation in the frequency domain;

DETAILED DESCRIPTION OF THE EMBODIMENTS

Figure 1:
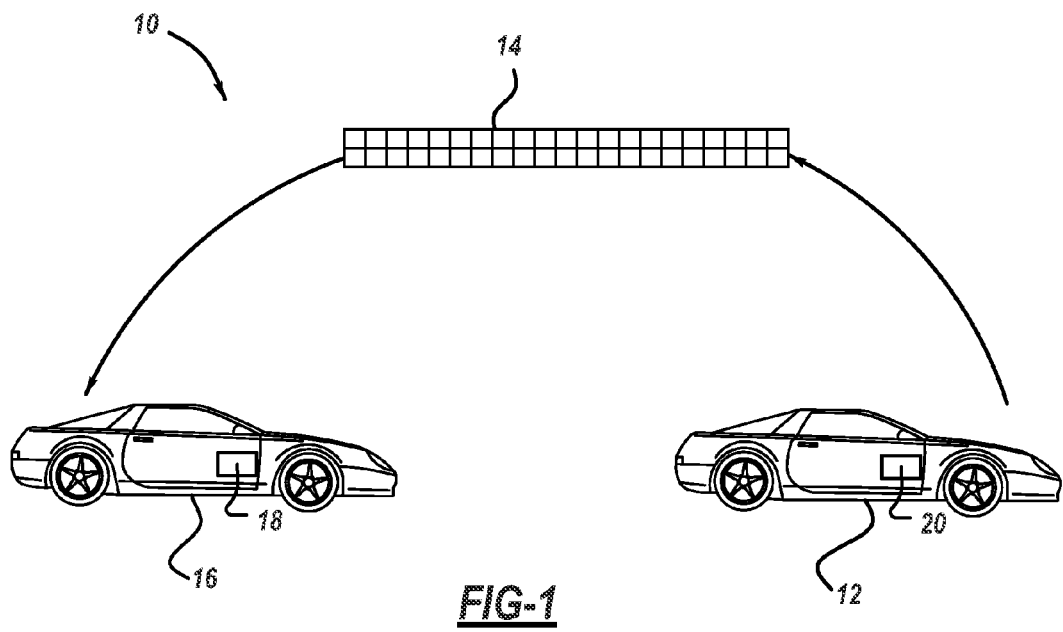
FIG. 1 is a block diagram of a vehicular communications network.

The following discussion of the embodiments of the invention directed to a wireless communications system is merely exemplary in nature, and is in no way intended to limit the invention or its applications or uses.

It is well known in the art that V2V wireless channels provide a very harsh signal propagation environment because of two phenomena. First, both the transmitter and receiver are in motion at a relatively high speed, and this leads to a short channel coherence time. Second, there are many objects around, many of them moving, for the signal to bounce off that causes long multipath components in the V2V communications environment leading to a narrow coherence bandwidths.

Coherence time and coherence bandwidth are fundamental characteristics of wireless channels. Coherence time is the time interval within which the channel is likely to be invariant in time domain. Coherence bandwidth is the bandwidth in which the channel is likely to be frequency flat fading, i.e., invariant in frequency domain. Coherence time and coherence bandwidth play important roles in channel estimation. In order to estimate channels accurately in the time domain, it is required that training symbols be separated in time by no more than the coherence time. Similarly, in order to estimate channels accurately in the frequency domain it is required that pilot subcarriers be separated in frequency by no more than the coherence bandwidth.

In the 802.11p standard, the channel estimation is realized by using training symbols at the beginning of each packet. Thus, the channel estimate is only valid when the duration of the packets is less than the coherence time, i.e., very short packets with less information. When the packet is long, the initial channel estimation becomes outdated by the end of the packet.

The simplest way to have accurate channel estimation is to insert several training symbols in the middle of each packet to guarantee that before the coherence time passes at least one training symbol will be present. However, since training symbols do not carry useful information, inserting training symbols wastes the bandwidth and significantly lowers the transmission rate.

This specification introduces a concept called Tentpoles Scheme where a symbol or a subcarrier serves a dual purpose. First, the symbol or subcarrier serves to convey data and second it serves to provide additional training symbols or pilot subcarriers. User data is the data that actually contains information that enables the applications on the transmitter and receiver to exchange information. The receiver can use the dual-use protected symbol as a training symbol to help with channel estimation. Also, the receiver can use the dual-use protected subcarrier as a pilot subcarrier to help with channel estimation. The dual-use data, also known as protected data, starts with user data and adds extra protection. The extra protection can be stronger Error Correction Codes (ECC) that improves the chance that the receiver can recover the user data. Once the receiver properly decodes the dual-use data symbol or dual-use subcarrier data, the receiver can enhance the channel estimation by using the decoded symbol or subcarrier as additional training symbols or additional pilot subcarriers.

FIG. 1 is a block diagram of a vehicular communications network 10 showing a vehicle 12 in the network 10 using a transceiver 20 to transmit a message 14, where a transceiver is a device that can function both as a transmitter and a receiver. A transceiver 18 in another vehicle 16 in the network 10 receives the message 14. The message 14 can be a message that follows the IEEE 802.11p communications standard discussed herein.

Tentpoles Scheme at the Transmitter

Figure 2:
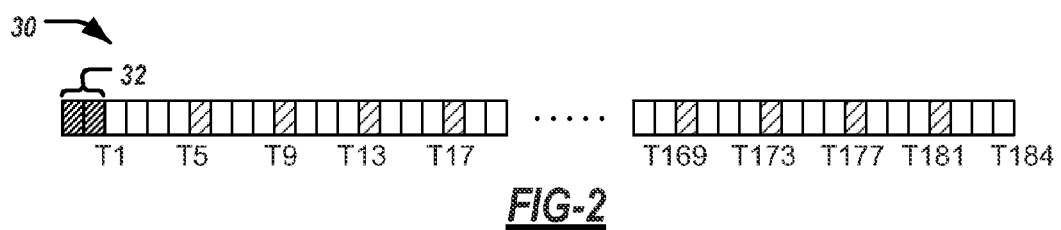
FIG. 2 is an OFDM packet using a Tentpoles Scheme implementation in the time domain.

FIG. 2 is an OFDM packet 30 using a Tentpoles Scheme implementation in the time domain. The 802.11p standard provides two training symbols 32 at the beginning of the packet 30. As discussed above, the initial channel estimation based on the training symbols 32 becomes outdated before the end of the packet 30 due to short coherence time. The OFDM packet 30 has 184 Orthogonal Frequency Division Multiplexing (OFDM) data symbols and is 1.5 ms in duration, which is significantly longer than the coherence that time can be found in a V2V communications environment, which could be only 0.1 ms. Thus, what the transceiver 18 needs from the packet 30 are more training symbols to track the channel variation.

The transceiver 20 can provide extra protection for some OFDM data symbols, for example, equally distributing dual-use protected data symbols. The OFDM packet 30 shows one possible Tentpoles Scheme embodiment in the time domain where data starts at T1 (@ time 1) and progresses to T184 (@ time 184). Extra protection is provided to 45 dual-use protected data symbols starting at symbol T5, with an equal separation of 4 data symbols, namely, T5, T9, T13, T17 ... T169, T173, T177 and T181, among the total 184 data symbols transmitted over the subcarrier from time 1 to 184. Note, a packet with 184 OFDM symbols is an example, where the actual packet length varies depending on the specific application.

The 802.11p standard protects all data symbols with convolutional codes, where the strongest convolutional code provided by the standard is a ½ rate convolutional code. In order to provide extra protection, the transceiver 20 can use an Error Correction Code (ECC) that is even stronger than the ½ rate convolutional code, e.g., ½ rate low-density parity-check (LDPC) code or ¼ rate convolutional code.

The transceiver 20 splits the data symbols for each packet into two groups. The first group is the dual-use data symbols (e.g. protected symbols) that have extra protection, i.e., very strong ECC. The second group is the rest of the data symbols with standard protection, e.g. ½ rate convolution code. In this way there are strongly protected dual-use symbols, e.g. T5, T9, T13, T17 ... T169, T173, T177 and T181, that the transceiver 18 uses as additional training symbols to enhance the channel estimate.

Figure 3:
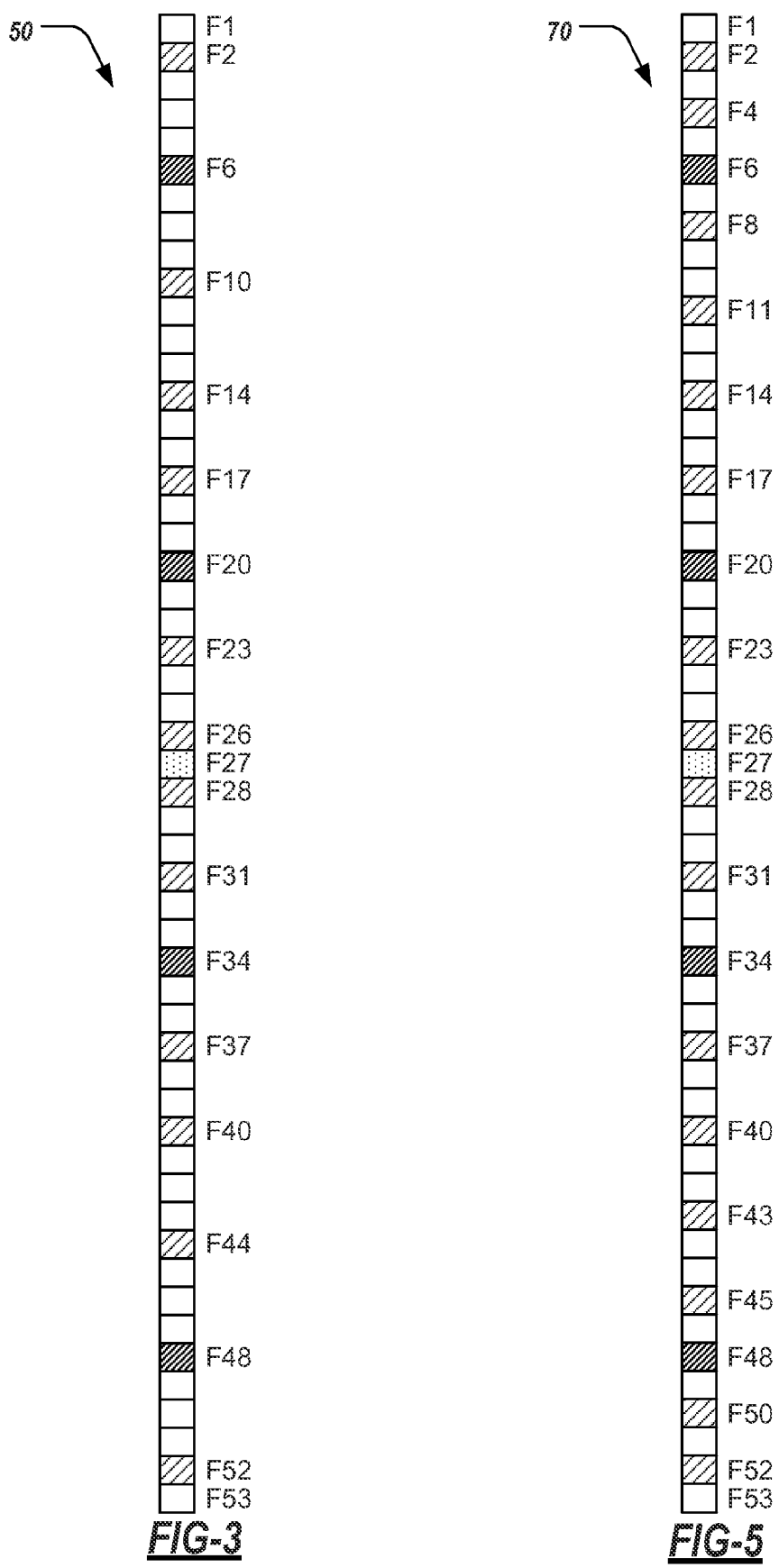
FIG. 3 is an OFDM symbol using a Tentpoles Scheme implementation in the frequency domain.

FIG. 3 is an OFDM symbol 50 using a Tentpoles Scheme implementation in the frequency domain. Each OFDM symbol includes several OFDM data symbols, and each OFDM symbol is transmitted across subcarriers. The 802.11p standard specifies not to use the F27 subcarrier for transmission. Among the fifty-two subcarriers, the 802.11p standard defines four pilot subcarriers F6, F20, F34 and F48 used for tracking the channel variations in the frequency domain and for frequency offset corrections. The remaining forty-eight subcarriers are data subcarriers used for transmitting user data.

The separation of the four pilot subcarriers is wider than the coherence bandwidth. As discussed above, the four pilot subcarriers are not enough to track the channel variations in frequency domain because of the narrow coherence bandwidth. The transceivers 18 and 20 needs more pilots to track the channel variations in the frequency domain in each OFDM symbol.

In a Tentpoles Scheme implementation the transceiver 20 provides extra protection to some data subcarriers so that each symbol on that subcarrier has extra protection. For example, the OFDM symbol 50 shows extra protection is provided on twelve subcarrier frequencies F2, F10, F14, F17, F23, F26, F28, F31, F37, F40, F44 and F52 so that those subcarriers can fulfill the dual use of transmitting user data and providing additional pilot subcarriers.

Similarly, the transceiver 18 receives each OFDM symbol and splits the forty-eight data subcarriers into two groups. The first group is the dual-use data subcarriers with very strong ECC, namely, F2, F10, F14, F17, F23, F26, F28, F31, F37, F40, F44 and F52. The second group includes the rest of the data subcarriers with standard protection. In this way, the transceiver 18 will use the dual-use subcarriers as additional pilots to enhance channel estimation to the subcarriers with normal protection.

Figure 4:
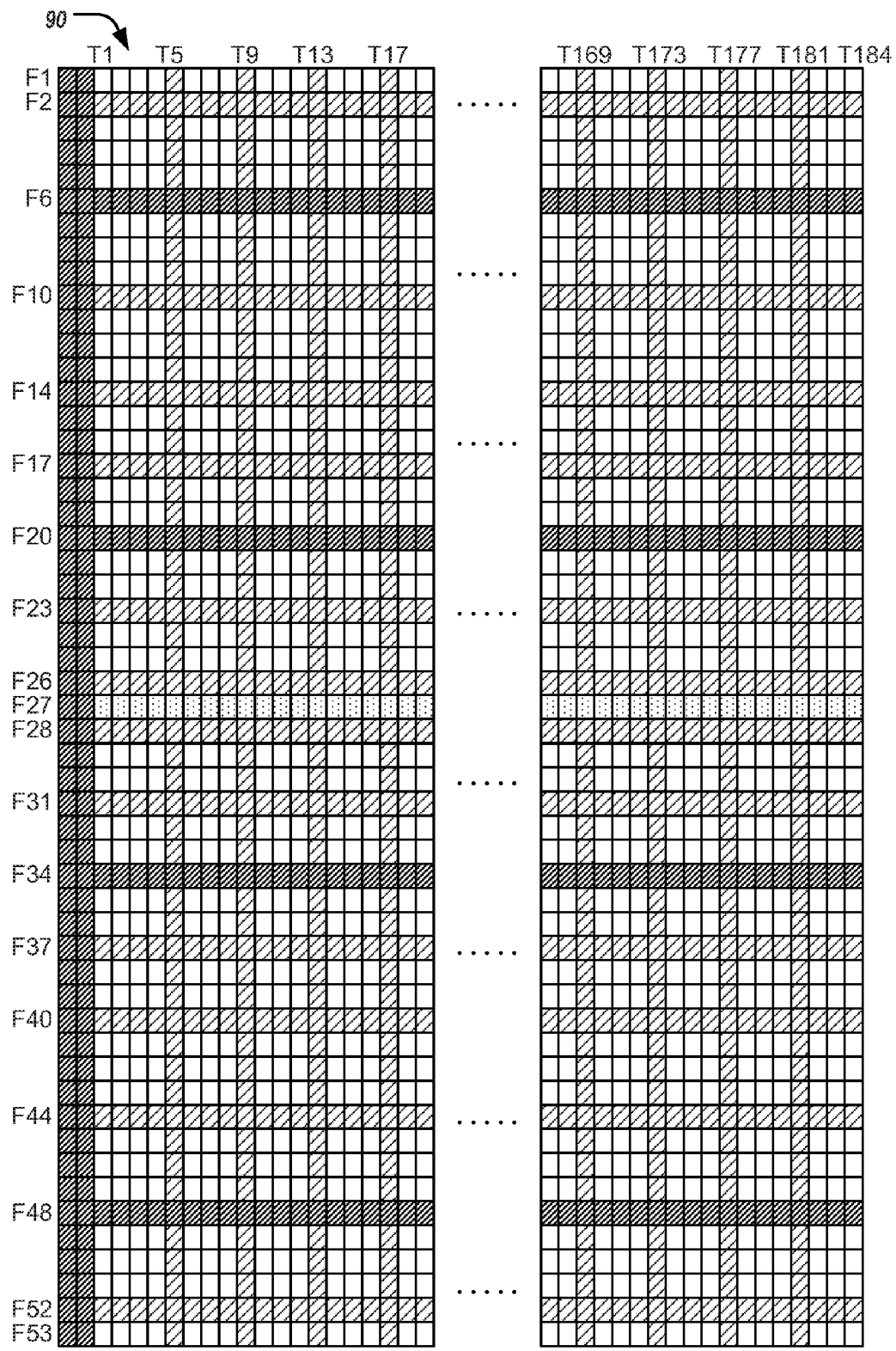
FIG. 4 is a data packet using a Tentpoles Scheme implementation in both time and frequency domains.

FIG. 4 shows a data packet 90 using a Tentpoles Scheme implementation in both the time and frequency domains. The data packet 90 has columns that hold OFDM symbols, rows that hold OFDM packets, and cells that hold OFDMA data symbols. The transceivers 18 and 20 can use dual-use data in both the time domain and frequency domain simultaneously. The dual-use data provides a more solid structure, like a tent-pole, and also as seen in the FIG. 4, extends upwards (for example T5) and graphically resembles a tent-pole, hence the name Tentpoles Scheme.

The OFDM symbol has fifty-two useful subcarriers in the frequency domain (the twenty-seventh subcarrier F27 is the center frequency, which is the zero subcarrier, and does not carry any data). Moving between rows the subcarrier frequency changes. The OFDM packet is 184 OFDM data symbols in the time domain. The data packet 90 shows one possible coding scheme implementation to use when implementing Tentpoles Scheme in the time domain. FIG. 4 shows eight of the forty-five dual-use OFDM symbols T5, T9, T13, T17 . . . T169, T173, T177 and T181. Simultaneously, the transceiver 20 provides extra protection to some data subcarrier frequencies F2, F10, F14, F17 F23, F26, F28 F31, F37, F40, F44 and F52 in those OFDM symbols without extra protection. For example, the symbols in subcarrier frequencies F2, F10, F14, F17 F23, F26, F28 F31, F37, F40, F44 and F52 are protected, for example, by strong ECC. The subcarriers in the data packet 90 also have the Standard 802.11p pilot subcarriers at frequencies F6, F20, F34 and F48.

The transceiver 20 splits the data symbols and subcarriers into two groups. The first group includes the dual-use data symbols T5, T9, T13, T17 . . . T169, T173, T177 and T181 and the dual-use subcarrier frequencies F2, F10, F14, F17 F23, F26, F28, F31, F37, F40, F44 and F52. The second group includes the rest of the data that has the standard protection. The transceiver 18 uses the symbols and subcarriers with strong protection for additional training symbols and pilots to improve channel estimates.

Data Protection Options

In order to provide extra protection to the dual-use data, an ECC is needed that is stronger than the 802.11p provided ½ rate convolutional code. Categorizing the options for the stronger ECC into three groups the options are 1) same rate with stronger error correction, 2) lower rate or 3) lower rate with stronger error correction.

The first group of options for the stronger ECC has the same rate as the standard-defined ½ rate convolutional code, but would have stronger error correction ability. Examples include ½ rate low-density parity-check (LDPC) code or ½ rate turbo code. The advantage to this approach is that the transmission rate and bandwidth efficiency will be unchanged. The disadvantages are that multiple different encoders and decoders would be involved, and therefore the complexity would increase.

The second group of options for the stronger ECC has lower data rate convolutional codes. Examples include ¼ rate convolutional code or ⅙ rate convolutional code. The advantage to these options are that it uses the same kind of encoder/decoder as the 802.11p standard, so the complexity is low. The disadvantage is that the lower rate convolutional codes will reduce the bandwidth efficiency.

The third group of options for the stronger ECC has lower rates with stronger ECC. Examples include ⅓ rate LDPC or ¼ rate turbo code. The advantage is that the transceivers 18 and 20 can use the same strong protection for both symbols and subcarriers. The disadvantages are that it requires a complex encoder/decoder and reduces the bandwidth efficiency.

The transceiver 20 can adjust the extra protection based on the accuracy of the channel estimation and the channel condition. Adjusting the extra protection can change the number of dual-use symbols or subcarriers or by vary the level of extra protection. Monitoring of the channel condition can use signal-to-noise ratio, bit-error rate or packet error rate. Examples of adjusting the number of subcarriers can be seen by comparing the OFDM symbol 50 to an OFDM symbol 70. The OFDM symbol 50 has twelve dual-use subcarriers frequencies F2, F10, F14, F17 F 23 F26, F28, F31, F37, F40, F44 and F52 in the frequency domain. OFDM symbol 70 has sixteen dual-use subcarrier frequencies F2, F4, F8, F11, F14, F17, F23, F26, F28, F31, F37, F40, F43, F45, F50 and F52. The transceiver 18 can use the sixteen dual-use subcarrier frequencies F2, F4, F8, F11, F14, F17, F23, F26, F28, F31, F37, F40, F43, F45, F50 and F52 as additional pilots, which can provide more accurate channel estimation than the embodiment shown in the ODFM symbol 50 that only has twelve dual-use subcarriers. Similarly, the transceivers 18 and 20 can adjust the number of dual-use symbols in the time domain. Generally, the more symbols or subcarriers that are protected, the more available training symbols or pilots there are for the transceiver 18 to use, which means the channel estimation will be more accurate. If the channel has a low Signal to Noise Ratio (SNR), e.g. heavy static, then the transceiver 20 needs to provide more symbols or subcarriers to protect the data and maintain good channel estimation.

The amount of dual-use data in a Tentpoles Scheme implementation can be adjustable and adapted to the channel conditions. If channel state information is available at the transmitter, then the transceiver 20 can choose to provide a protection level appropriate to the channel conditions. The transceiver 20 can obtain channel state information either through exploiting the channel reciprocity or through a feedback mechanism from the receiver 18.

When the channel condition is good, e.g., high SNR, the transceiver 18 accurately estimates the channel with less dual-use symbols or subcarriers. On the other hand, when the channel condition is harsh, e.g., low SNR, it is more difficult for the transceiver 18 to accurately estimate the channel and more dual-use symbols and/or dual-use subcarriers are needed. The transceiver 20 can make such adjustments as the channel conditions change.

Figure 6:
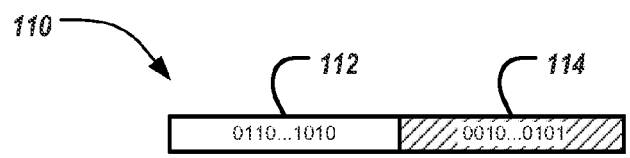
FIG. 6 is a data symbol with a systematic code.

For a Tentpoles Scheme implementation, the transceivers 18 and 29 can protect data in another ways, for example by using systematic codes. FIG. 6 is a data symbol 110 of a systematic code that consists of two parts, namely, information bits 112 and checking bits 114.

This specification only details some possible Tentpoles Scheme embodiments. Those of ordinary skill in the art would understand that these are just some examples of the many possible implementations. A person of ordinary skill in art can adjust the location and number of the dual-use symbols or dual-use subcarriers as necessary for a particular application.

Figure 7:
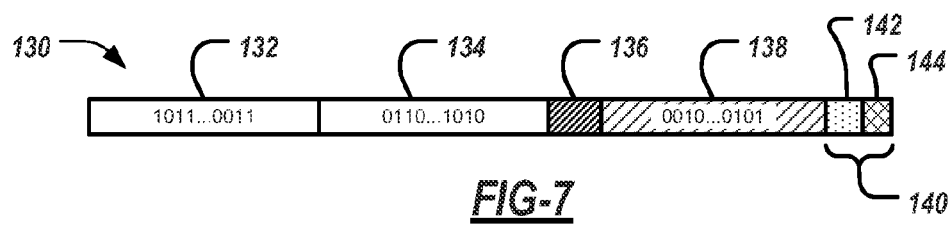
FIG. 7 is an OFDM packet with details including a systematic code in the trailer from the transmitter's perspective.

FIG. 7 is an OFDM packet 130 that is a modified 802.11p frame structure with Tentpoles Scheme and a systematic code from a transmitter's perspective. From the transmitter's perspective, the payload data 130 has information bits 132 and 134 followed by cyclic redundancy check (CRC) 136 then the checking bits 138 and finally a trailer section 140. The information bits 134 have extra protection from the checking bits 138 and the two combined make up the systematic code. The OFDM packet 130 also has the CRC 136, which is a well-known error detection code. After the user data, the 802.11p standard calls for the trailer section 140 that consists of tail bits 142 followed by padding bits 144. The tail bits 142 consists of six successive zero bits for resetting the convolutional encoder. A standard 802.11p receiver ignores the padding bits 144.

Figure 8:
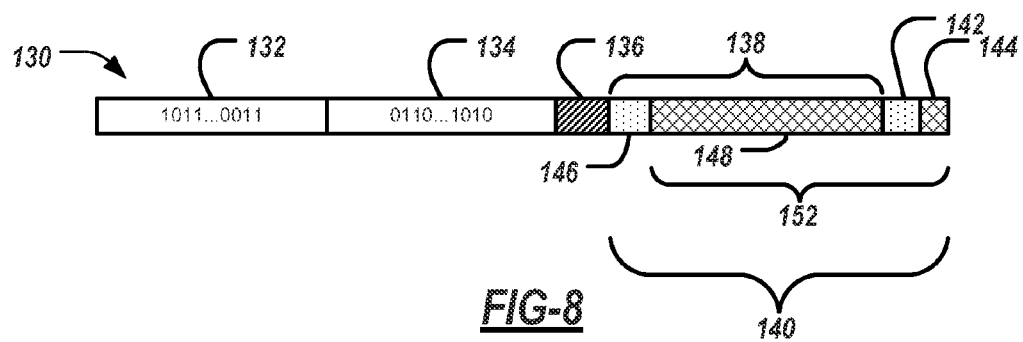
FIG. 8 is the OFDM packet with details including the systematic code in the trailer from the receiver's perspective.

FIG. 8 is the OFDM packet 130 with details including the systematic code in the trailer section 140 from the receiver's perspective. By designing the checking bits 138 to start with six zeros 146. The six zeros 146 will trick the transceiver 18 that is processing the signal into thinking that the trailer section 140 has started. This new longer trailer section holds a long padding 152 that includes remaining checking bits 148 followed by the original tail bits 142 and padding bits 144. This approach allows a standard 802.11p receiver to decode transmission, and, in addition, an upgraded receiver can take advantage of the checking bits 146 to enable enhanced decoding. This approach is possible because the 802.11p standard does not limit the size of the padding bits.

The transceiver 18 can make use of the decoded information bits 134 to estimate the channel. The systematic code can be very strong block codes such as low-density parity-check (LDPC) code to provide strong protection. The transceiver 18 can determine if it correctly received the information bits 132 and 134 by using the CRC 136.

Tentpoles Scheme at the Receiver

Figure 9:
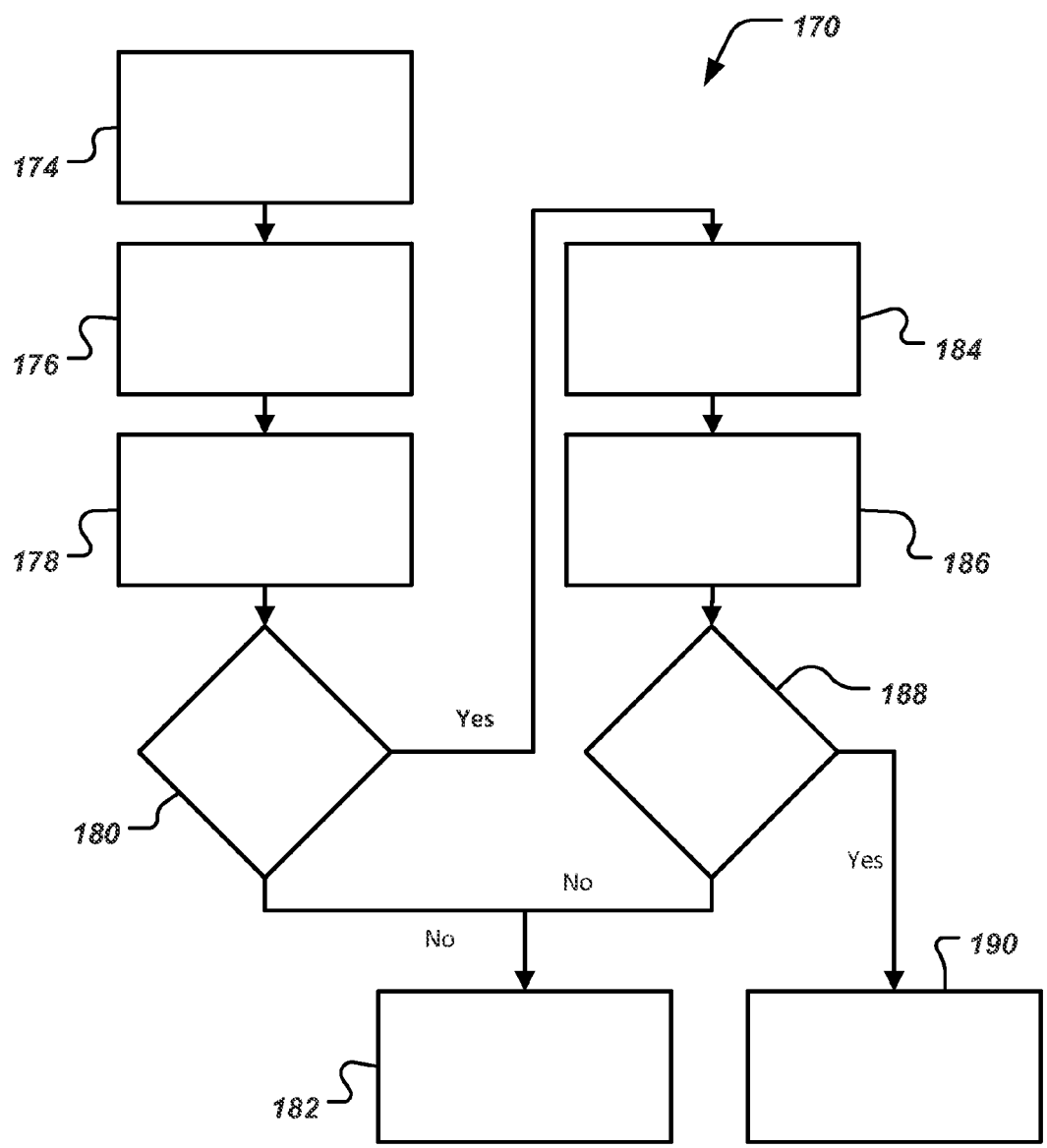
FIG. 9 is a flowchart showing how a receiver can decode Tentpoles Scheme data to enhance channel estimation.

FIG. 9 is a flowchart 170 that the transceiver 18 could use to process a Tentpoles Scheme signal corrupted by the transmission channel. The flowchart 170 shows how to make use of the information provided by the dual-use protected symbols or subcarriers to achieve accurate channel estimation and low Packet Error Rate (PER). The flowchart 170 starts at box 174 when the transceiver 18 receives the packet signal. Next, at box 176, the transceiver 18 creates a first channel estimate based on the two standard training symbols 32 located at the beginning of the packet. The decoding methods can include Spectral Temporal Averaging (STA) and Triple Decoding as described in U.S. Patent Application Publication No. US 2011/0280325 A1 titled "Spectral-Temporal Averaging for IEEE 802.11p dynamic Channel Equalization," and U.S. patent application Ser. No. 13/585,656 titled "Method and Apparatus of Triple-decoding for IEEE 802.11p Physical Layer Mechanism," both of which are hereby incorporated by reference in their entireties.

Next, at box 178, the transceiver 18 can perform the decoding of the dual-use data with the first channel estimate. Although the first channel estimation may not be accurate, especially as the signal moves away from the training symbols 32, the dual-use data with its extra protection, e.g. strong ECC, is resistant to channel estimation errors and is likely to be correctly decoded.

Next, at decision diamond 180, the transceiver 18 determines if the dual-use data has been successfully decoded. The transceiver 18 will have received two CRC codes, one is for the dual-use data and the other is for the standard data. If the CRC check of the dual-use data fails then the transceiver 18 proceeds to box 182 and requests retransmission of the whole packet, since the V2V channel conditions were too harsh. If the CRC check of the dual-use data was successful then the transceiver 18 proceeds to box 184.

At box 184, the transceiver 18 can make use of the additional training symbols or pilot subcarriers to perform a second channel estimation. The second channel estimation is more accurate than the first channel estimate because of the more available training symbols or pilot subcarriers, especially as the time passes since the training symbols 32 at the beginning of the packet.

Next, at box 186, the transceiver 18 uses the second channel estimation to decode the normally protected data symbols, the standard data. Although the 802.11p defined convolutional code is weaker than the dual-use protected data, the accuracy of the second channel estimation helps achieve better decoding performance. The transceiver 18 can decode using the previously mentioned Spectral Temporal Averaging (STA) and Triple Decoding.

Next, at decision diamond 188, the transceiver 18 uses the second CRC to check if the standard data has been successfully decoded. If the standard data fails the CRC check then the transceiver 18 asks for retransmission at box 182. If the CRC check of the standard data was successful then the transceiver 18 has successfully receives the packet as noted at box 190.

The procedure for decoding the signal at the transceiver 18 can be described using the following pseudo code:

```
for each received packet
    create 1st channel estimation
    decode strong ECC using the 1st channel estimation
    if CRC check 1 not passed
        request retransmission
    else
        create 2nd channel estimation
        decode the convolutional code using 2nd channel estimation
        if CRC check 2 not passed
            request retransmission
        else
            packet successfully received
        end
    end
end
```

Test Results

Performance testing found Tentpoles Scheme was better than previously develop STA Decoding and Triple Decoding. For testing, the STA and Triple Decoding implementations used a ½ rate convolutional code for the channel coding and BPSK modulation. This provided a transmission rate of 3 Mbps.

For testing, the Tentpoles Scheme implementation used a ¼ rate convolutional coding for the strong ECC to protect forty-five symbols in the time domain. For the Tentpoles Scheme implementation in the frequency domain twelve subcarriers were dual-use. This extra protection leads to a rate loss of ⅛ of 3 Mbps, thus, a real transmission rate of 2.6 Mbps.

Two environments were tested, namely, highway and rural. Table 1 shows that Tentpoles Scheme out-performed STA Decoding and Triple Decoding by providing further reducing in the PER. The average SNR of the collected real V2V channels was 16 dB, and 10% PER can be achieved through Tentpoles Scheme in such V2V channels. For the V2V channels, Tentpoles Scheme in the frequency domain is slightly better than Tentpoles Scheme in the time domain.

TABLE 1

PER results in with real V2V channels

| Scheme | Highway | Rural |
|---|---|---|
| STA Decoding | 17.6% | 17.4% |
| Triple Decoding | 15.2% | 15.1% |
| Tentpoles Scheme (Time Domain) | 10.0% | 9.9% |
| Tentpoles Scheme (Frequency Domain) | 9.8% | 9.8% |

Figure 10:
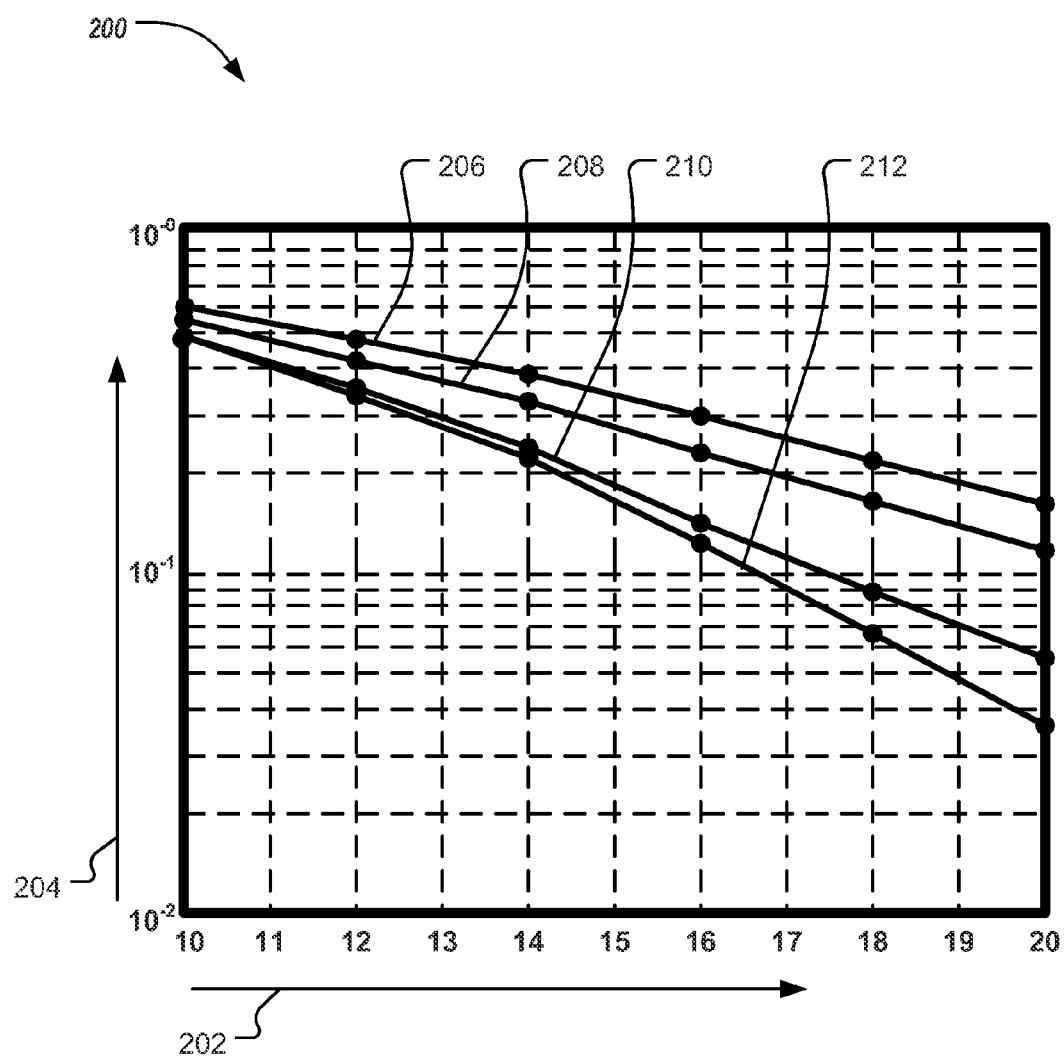
FIG. 10 is a graph showing the results of a Tentpoles Scheme implementation.

FIG. 10 is a graph 200 showing how Tentpoles Scheme reduces the PER compared to other schemes. A computer simulated synthetic highway environment channels and performed testing of different receiver schemes. The overall performance, PER, of the wireless communications schemes with the synthetic channel was tested at various noise/static levels, SNR, and graphed.

The graph 200 has an X-axis 202 and a Y-axis 204. The X-axis 202 shows increasing single strength, measured as Signal to Noise Ratio (SNR) starting at 10 dB and going to 20 dB. The Y-axis 204 shows increasing errors, measured as Packet Error Rate (PER), indicating the percent of the packets that were not received, i.e., had errors, with a Logarithmic scale. The PER starts at 0.01 (or 1%) and goes to 100% on a log scale. The graph 200 shows that as the signal gets stronger, larger SNR, then the PER reduces. A Spectral Temporal Averaging (STA) line 206 shows how STA starts at about 60% loss at 10 dB SNR and improves to 16% loss at 20 db SNR. A Triple Decoding scheme graph line 208 starts at 54% loss at 10 dB SNR and improves to 11% loss at 20 dB SNR. Graph line 210 of Tentpoles Scheme in a time domain line 210 starts at about 50% loss 10 dB SNR, and improves to 5.6% loss at 20 dB SNR. Tentpoles Scheme used in a frequency domain graph line 212 starts at 49% loss at 10 dB SNR and improves to 3.5% loss at 20 dB SNR.

From the graph 200 significant improvement of the PER performance can be observed when comparing Tentpoles Scheme to STA and Triple Decoding. Using Tentpoles Scheme achieves less than 10% PER, which can provide reliable communications. When the SNR is indicating clearer reception, e.g., 20 dB, Tentpoles Scheme can achieve excellent results with as low as 3.5% PER. For V2V channels, the frequency domain Tentpoles Scheme is slightly better than time domain Tentpoles Scheme.

Although this specification details using Tentpoles Scheme to improve the performance for V2V communications, one of ordinary skill in the art would realize that Tentpoles Scheme could also be used in other communications situations.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

Give all terms used in the claims their broadest reasonable construction and their ordinary meaning as understood by those skilled in the art. Use of the singular articles such as "a", "the", "said", etc. should be read to recite one or more of the indicated elements.

What is claimed is:

1. A communications system comprising: a transmitter that transmits a signal including user data as normal data symbols and at least one dual-use data symbol, where the at least one dual-use data symbol includes data and additional training symbols, said at least one dual-use data symbol having extra protection that is better than the normal data symbols; and a receiver that receives the signal, said receiver decoding the at least one dual-use data symbol and identifying information in the at least one dual-use data symbol that improves channel estimation accuracy, where the transmitter varies the at least one dual-use data symbol based on a channel condition, where the channel condition defines the reliability of the channel.

2. The system of claim 1 where the signal includes multiple subcarrier frequencies and where at least one of the subcarrier frequencies is a dual-use subcarrier frequency, where the dual-use subcarrier frequency includes extra protection for the data symbols that are transmitted in the dual-use subcarrier frequency.

3. The system of claim 1 where varying the at least one dual-use data symbol varies the level of extra protection on the at least one dual-use data symbol or where the at least one dual-use data symbol is a plurality of data symbols and the transmitter varies the number of dual-use data symbols by equally separating the dual-use data symbols among the normal symbols.

4. The system of claim 3 where the channel condition is monitored using a signal-to-noise ratio, a bit-error rate or a packet error rate.

5. The system of claim 1 where the extra protection uses convolution coding or low-density parity-check (LDPC) coding.

6. The system of claim 1 where the signal is compliant with an 802.11 p standard, and the data symbols are orthogonal frequency division multiplexing (OFDM) data symbols.

7. The system of claim 1 where the extra protection uses a systematic code that has information bits and checking bits.

8. The system of claim 7 where the signal is an 802.11 p signal that has tail bits, and where the checking bits are located after the tail bits.

9. The system of claim 1 where the communications system is a vehicular communications system.

10. A communications system comprising: a transmitter that transmits a signal including user data in normal subcarriers and in at least one dual-use subcarrier where the at least one dual-use subcarrier includes data and additional training symbols, said at least one dual-use subcarrier having extra protection that is better than the normal subcarriers; and a receiver that receives the signal, decodes the at least one dual-use subcarrier and uses information from decoding the subcarrier to improve an estimation accuracy of the normal subcarrier, where the transmitter varies the at least one dual-use data symbol based on a channel condition, where the channel condition defines the reliability of the channel.

11. The system of claim 10 where the subcarriers include dual-use data symbols and where a first normal subcarrier includes at least at least one, but less than all, dual-use data symbol, where the dual-use data symbols have extra protection better than a normal data symbol and where the dual-use data symbols are separated equally among the normal symbols.

12. The system of claim 10 where varying the dual-use subcarriers varies the level of extra protection on the at least one dual-use subcarrier or where the at least one dual-use subcarrier is a plurality of dual-use subcarriers and the transmitter varies the number of dual-use subcarriers.

13. The system of claim 10 where the extra protection uses convolution coding or low-density parity-check (LDPC) coding.

14. The system of claim 10 where the signal is an 802.11 p signal.

15. The system of claim 14 where the extra protection uses a systematic code with information bits and checking bits and where the 802.11 p signal has one or more sets of tail bits and the checking bits are located after one of the tail bits.

16. A vehicular communications system comprising: a transmitter transmitting a signal with user data as normal data symbols and at least one dual-use data symbol, where the at least one dual-use data symbol includes data and additional training symbols, said at least one dual- use data symbol having extra protection that is better than the normal data symbols; and a receiver that receives the signal, decodes the at least one dual- use data symbol and uses information from decoding the at least one dual-use data symbol to improve accuracy of a channel estimation, where the transmitter varies the at least one dual-use data symbol based on a channel condition, where the channel condition defines the reliability of the channel.

17. The system of claim 16 where the dual-use data symbol is a plurality of dual-use data symbols that are located at different times such that the plurality of dual-use data symbols are separated equally among the normal symbols.

18. The system of claim 16 where the dual-use data symbol is located in different frequencies.

* * * * *